UNITED STATES PATENT OFFICE.

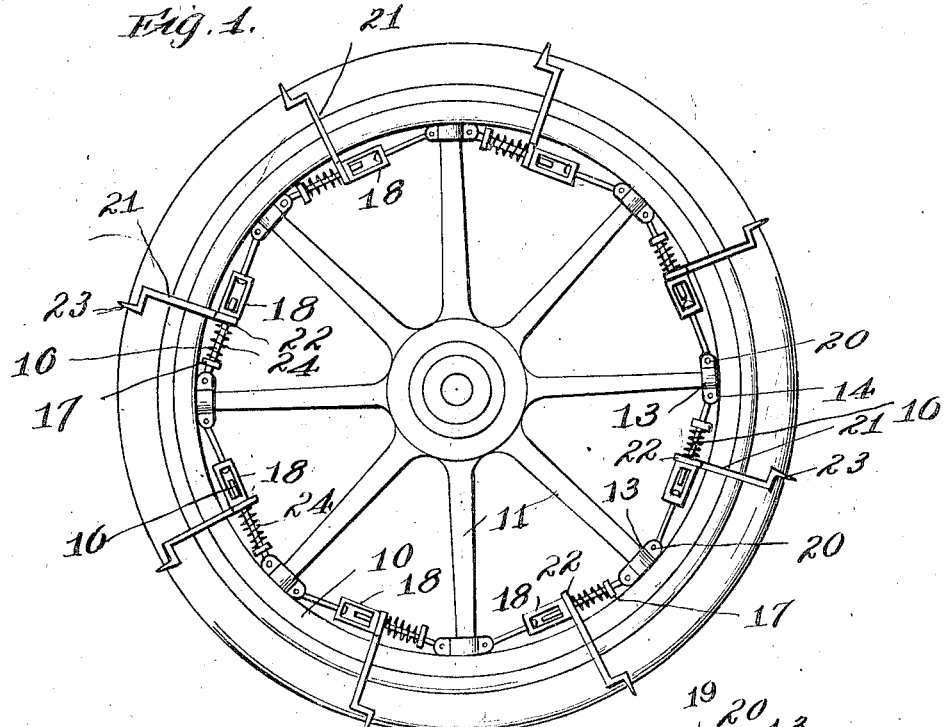

ALEXANDER MEDVE, OF MOHAWK, MICHIGAN.

ANTISKID ATTACHMENT.

1,104,526.  Specification of Letters Patent.  Patented July 21, 1914.

Application filed February 24, 1914. Serial No. 820,598.

*To all whom it may concern:*

Be it known that I, ALEXANDER MEDVE, a subject of the King of Hungary, residing at Mohawk, in the county of Keweenaw and State of Michigan, have invented certain new and useful Improvements in Antiskid Attachments, of which the following is a specification.

This invention relates to certain new and useful improvements in anti-skid attachments for automobile tires.

According to my invention, I provide an anti-skid attachment for automobile tires that positively engages the road to prevent any skidding of the wheels.

A further object of my invention is to provide an anti-skid attachment for vehicle tires that will be freed from the road as the wheel revolves in traction movement, but which will immediately engage the road to prevent skidding.

With the above and other objects in view, that will appear as the nature of the invention is better understood, the same consists in the novel construction and arrangement of parts to be hereinafter more specifically described and then claimed, reference being had to the accompanying drawing by like characters designating corresponding parts throughout the several views, and wherein:—

Figure 1 is a side elevational view of an automobile wheel embodying my invention. Fig. 2 is an enlarged cross-sectional view taken on line x—x of Fig. 1, and, Fig. 3 is an enlarged detail plan view of a portion of the mechanism for securing the anti-skid devices to the tire.

The present form of anti-skidding device is so positioned with respect to the tread of the wheels and is of such character that damage and injury to the roads, especially asphalt pavements, results by the engagement of the anti-skidding devices therewith.

It is an object of the present invention to obviate this injury to pavements, by providing an anti-skidding device that is inactive during the traction movement of the vehicle wheels, but which will be brought into positive engagement with the pavement should the wheels attempt a skidding movement.

Referring more specifically to the drawing accompanying this application and in which is shown a preferred embodiment of my invention, the reference numeral 10 designates the rim of a wheel of usual construction, having spokes 11 and having mounted upon the said rim a conventional form of pneumatic tire 12.

Means carried by the spokes 11 of the wheel constitute supporting means for the anti-skidding members and comprise in detail, clamp members 13 secured to each of the spokes 11, as clearly shown in Fig. 3. Each of the clamps 13 is provided with ears 14, in which is received a pin 15 constituting a pivot for one end of a threaded bolt 16. A nut 17 is threaded on the bolt 16 and is positioned thereon at a desired point. A turn-buckle 18 or other suitable adjusting mechanism is received on the free end of the threaded bolt 16; and disposed within the other end of the turn-buckle 18 is the head of the bolt 19, a bolt 19 being pivotally-mounted on a pin 20 in the opposing ears 14' of the clamp 13. The clamps 13 are positioned on the spokes 11 at the outer ends thereof and adjacent the rim 10 and are suitably held in such position as by the pins 15 and 20. Mounted on the threaded bolts 16 are the anti-skidding devices, each device consisting of an inverted U-shaped member comprising the side arms 21 and formed at its inner end with an eye 22 to be received on said bolt and provided at the ends of the side arms with road-engaging points 23. A compression coil spring 24 is mounted on the bolt 16 between the nut 17 and the eye 22 of the anti-skidding device.

By adjusting the turn-buckle 18 on the threaded bolt 16, the tension of the spring 24 upon the anti-skidding members may be controlled, it of course being understood that the eye 22 of the skidding members is loose enough upon said bolt to permit a slight swinging movement of the anti-skidding members. Resilient material is preferably employed in the manufacture of the anti-skidding members so that when the wheel is in ordinary traction the said members will be permitted to flex and be removed from the road so that the same will not injure the road.

It is not my intention that the present invention be utilized in a manner to assist traction, but be wholly confined for the prevention of skidding movement of wheels.

When the points 23 of the side arms 21 are brought into engagement with the road, the resiliency of the arms will permit the points 23 to spread outwardly and not positively engage the road, and at the same time the arms 21 with their road-engaging points 23 may have a slight swinging movement at its eye connection 22 with the bolt 16. Should the wheel skid, the side arms 21 will, by such movement, be brought into engagement with the sides of the tire, such movement being caused by the points 23 positively engaging the road in such skidding movement.

While I have shown and described the preferred embodiment of my invention, I do not wish to confine myself to the specific details of construction as shown, as various forms, modifications, and arrangement of the parts may be had without departing from the spirit and scope of the invention as claimed.

What I claim as new and desire to secure by Letters Patent is:—

1. The combination with a vehicle wheel, of an anti-skid device comprising a U-shaped resilient member having arms embracing the outer sides of the wheel tire and so constructed at their outer ends as to adapt said ends to engage a road surface, means for supporting said resilient member at a point midway of its length on the inner side of the tire, comprising an eye on the U-shaped member, a bolt extending through said eye, and means for securing the ends of said bolt.

2. The combination with a vehicle wheel, of an anti-skid device comprising a U-shaped resilient member having arms embracing the outer sides of the wheel tire and so constructed at their outer ends as to adapt said ends to engage a road surface, means for supporting said resilient member at a point midway of its length on the inner side of the tire, comprising an eye on the U-shaped member, a bolt extending through said eye, means for securing the ends of said bolt consisting of a clamp on the wheel spoke pivotally connected to one end of the bolt, and an adjusting device at the opposite end of said bolt.

3. The combination with a vehicle wheel, of anti-skid means, comprising a plurality of U-shaped resilient members each formed with a central eye and sharpened outer ends, clamps on the wheel spokes adjacent to their outer ends, bolts extending through said eyes and pivotally secured at one end to said clamps, coil springs encircling said bolts, and turn-buckles on the free ends of said bolts connecting the latter to the clamp on the adjacent spoke.

In testimony whereof I affix my signature in presence of two witnesses.

ALEXANDER MEDVE.

Witnesses:
 JOHN SZINKO,
 JOSEPH CROBÁDY.

---

Copies of this patent may be obtained for five cents each, by addressing the "Commissioner of Patents, Washington, D. C."